(12) United States Patent
Gauthier

(10) Patent No.: US 6,652,207 B2
(45) Date of Patent: Nov. 25, 2003

(54) ANCHOR FOR HARD MATERIAL HAVING AN EXPANSIBLE SLEEVE WITH A DEFORMABLE END PORTION

(75) Inventor: Alain Gauthier, Saint Jean de Muzols (FR)

(73) Assignee: Société de Prospection et d'Inventions techniques SPIT, Bourg-les-Valence (FR)

( * ) Notice: Subject to any disclaimer, the term of this patent is extended or adjusted under 35 U.S.C. 154(b) by 4 days.

(21) Appl. No.: 10/020,970

(22) Filed: Dec. 19, 2001

(65) Prior Publication Data

US 2002/0076298 A1 Jun. 20, 2002

(30) Foreign Application Priority Data

Dec. 20, 2000 (FR) .............................. 00 16654

(51) Int. Cl.[7] ................................ F16B 00/00
(52) U.S. Cl. ....................................... 411/60.3
(58) Field of Search .................. 411/57.1, 60.1, 411/60.3, 71, 72, 54

(56) References Cited

U.S. PATENT DOCUMENTS

| 688,756 A | * 12/1901 | Tripp |
| 3,107,570 A | * 10/1963 | Zifferer |
| 4,968,199 A | * 11/1990 | Haage |
| 4,984,945 A | * 1/1991 | Bergner |
| 5,993,129 A | * 11/1999 | Sato |

FOREIGN PATENT DOCUMENTS

| EP | 0 913 592 | 5/1999 |
| FR | 2 130 091 | 11/1972 |

* cited by examiner

*Primary Examiner*—Flemming Saether
(74) *Attorney, Agent, or Firm*—Lowe Hauptman Gilman & Berner LLP

(57) ABSTRACT

The expanding sleeve (1) of the anchor has an interior bore (13) and an expander plug (15) which are conical, with roughly the same cone angle, and designed so as, through the wedge effect caused by the plug (15) being driven into the sleeve (1) to cause it to expand. The sleeve (1) has, at its periphery, an annular weakening groove (9) intended, during expansion, to shorten its axial expansion length.

15 Claims, 2 Drawing Sheets

ANCHOR FOR HARD MATERIAL HAVING AN EXPANSIBLE SLEEVE WITH A DEFORMABLE END PORTION

TECHNICAL FIELD

The invention relates to an anchor comprising an expanding sleeve and an expander plug; the sleeve comprises an expanding skirt with axial slots and, between the slots, expanding legs which between them form a conical axial bore which converges towards the free ends of the legs; the expander plug is also conical, with the same cone angle as the conical bore of the expanding skirt in which it is fitted; through a wedge effect, brought about by the expander plug being driven into the bore of the expanding skirt, the legs pivot and the skirt expands to anchor itself in the wall of the material which takes it.

BACKGROUND ART

Such anchors are well suited to materials of the concrete type. In the case of soft material, no problems arise. By contrast, in the case of hard material and because of the firmness of the legs and of the material, it is no longer possible for the plug to be driven far enough into the skirt and its expansion is not great enough to provide adequate anchorage.

SUMMARY OF THE INVENTION

The invention sets out to solve this problem.

To this end, the invention relates to an anchor for hard material having an expanding sleeve with an interior bore and an expander plug which are conical, with roughly the same cone angle, and designed so as, through the wedge effect caused by the plug being driven into the sleeve, to cause it to expand, the anchor being characterized in that it comprises means designed, during expansion, to shorten the axial expansion length of the expanding sleeve.

Thus, if the sleeve is functionally shortened, the plug can be driven in more fully and can correctly expand the functional axial portion of the sleeve engaged by the plug.

As a preference, the means of shortening the sleeve are designed to be able to drive the plug beyond the expansion end of the sleeve.

Advantageously, the shortening means are designed to shorten the expansion length of the sleeve by radially compressing an axial base portion of the sleeve.

In the preferred embodiment of the anchor of the invention, the shortening means comprise an annular weakening groove formed at the periphery of the sleeve, beyond which the axial base portion of the sleeve has an interior bore with a cone angle which is at least inflected with respect to that of the plug.

BRIEF DESCRIPTION OF THE DRAWINGS

The invention will be better understood from reading the following description of the preferred embodiment of the anchor, with reference to the appended drawing, in which.

DETAILED DESCRIPTION OF THE INVENTION

Figure 1:
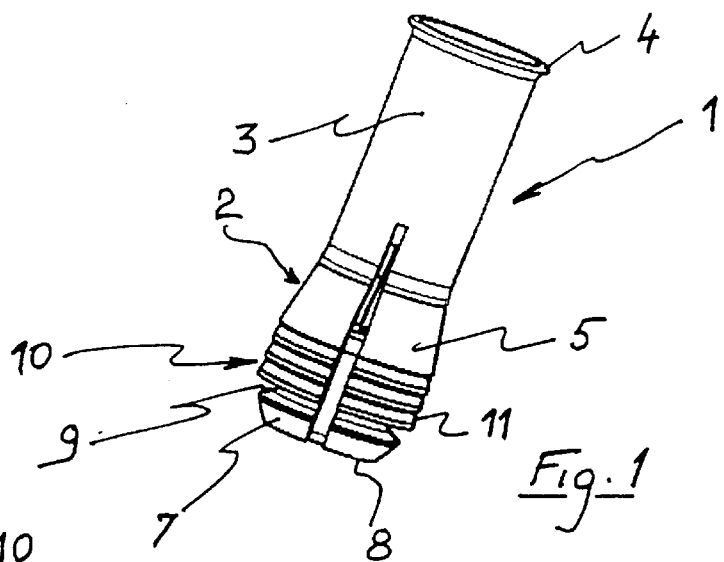
FIG. 1 is a perspective view of the anchor during expansion.
Figure 2:
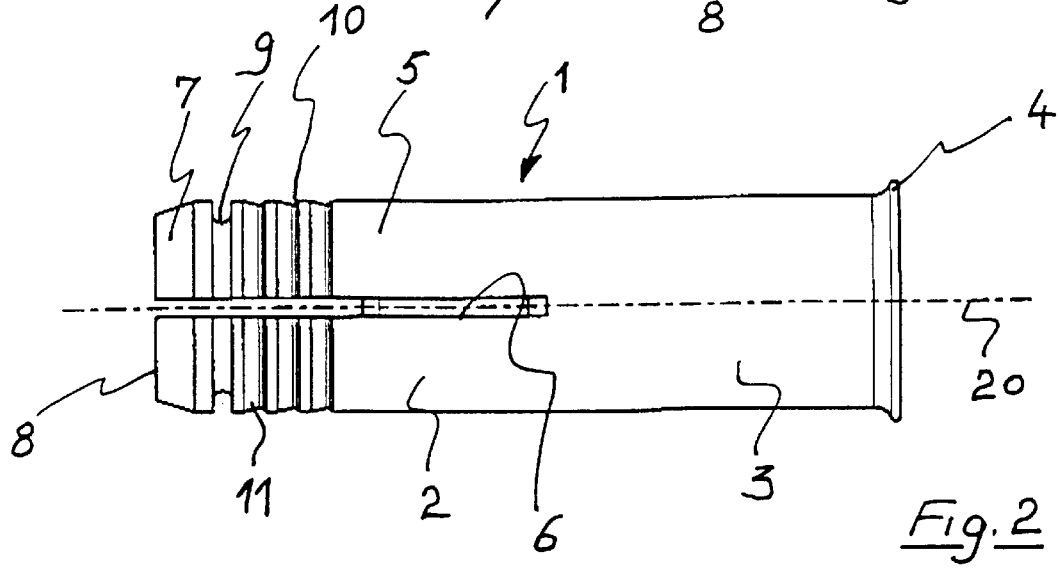
FIG. 2 is a profile view of the anchor.
Figure 3:
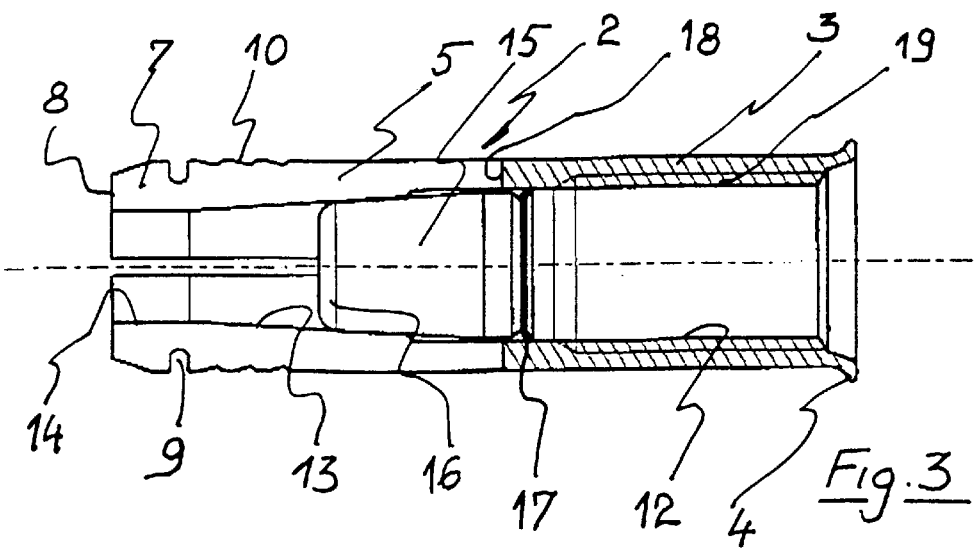
FIG. 3 is a view of the anchor in axial section.

The anchor comprises an expanding sleeve 1, of axis 20, with an expanding skirt 2 extending a portion of the cylindrical body 3, at the free end of which is formed a head flange 4 for fitting and holding the anchor in an accommodating hole in the support material. The skirt 2 has expanding legs 5 formed between slots 6 extending overall in axial planes of the sleeve.

The sleeve comprises an axial base portion 7 which is deformable in radial compression and which extends between the end 8 of the sleeve and an annular weakening groove 9 formed at the periphery of the sleeve. Upstream of the weakening groove 9 there extends, towards the body 3 of the sleeve, an axial gripping portion 10 with peripheral grooves or channels 11 to improve the anchorage of the sleeve in the support material.

Formed inside the sleeve is an interior bore with three portions in the continuation of one another. The bore portion 12 of the body portion 3 of the sleeve is cylindrical. The bore portion 13 of the expanding skirt 2, upstream of the base portion 7 and downstream of the body portion 3, which extends the cylindrical bore portion 12, is conical, converging towards the base portion 7 and the end 8 of the sleeve. Finally, the bore portion 14 of the base portion 7, which extends the conical bore portion 13, is cylindrical. More generally, and for a reason which will become apparent later on, the cone angle of the bore of the base portion 7 is at least inflected with respect to that of the bore 13. This cone angle may be smaller, zero (in which case the bore is then cylindrical), or even inverted, in which case the bore then diverges towards the end 8 of the sleeve.

The bore 12 of the body portion 3 comprises a tapping 19 extending from the flange 4 to slightly upstream of the regions 18 at which the legs 5 are articulated.

At rest, the anchor is externally cylindrical overall. The radial thickness of the expanding legs 5 increases slightly from their region 18 of articulation to the body portion 3 as far as the weakening groove 9, that is to say over the axial expansion length of the sleeve.

The anchor also comprises an expander plug 15, of conical shape, with roughly the same cone angle as the bore 13 of the expanding skirt 2. It is slightly chamfered at the front end 16. At the rear, there is a small strip 17 for retaining the plug.

Having described the anchor, let us now tackle its operation.

Having previously bored in material 21, to which a part is to be fixed using the anchor, a hole 22 which is deeper than the axial length of the anchor and has a diameter very slightly greater than that of the cylindrical outer envelope of the anchor, the anchor is inserted into the hole 22 until the flange 4 rests against the surface 23 of the material.

Then, using an appropriate tool, the expander plug 15 which was inside the sleeve, retained by the small strip 17 slightly upstream of the articulation regions 18, is hammered in. As the cone angle of the plug 15 and of the bore portion 13 inside the legs 5 is the same, the legs 5 pivot outwards by a wedge effect about their articulation regions 18, the skirt 2 expands and becomes anchored in the material 21.

Figure 4:
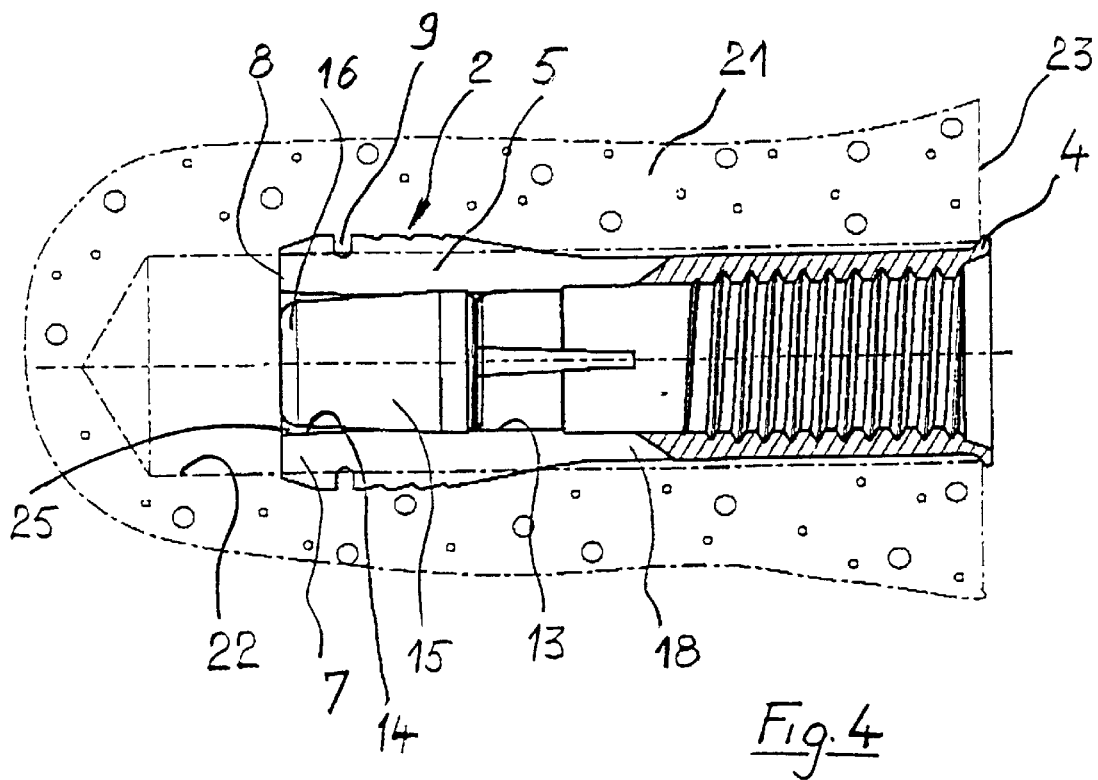
FIG. 4 is a view of the anchor in axial section after anchorage in soft material.

In soft material (FIG. 4), the plug 15 can easily be driven in until its chamfer 16 reaches, for example, the end 8 of the base portion 7 of the sleeve, the legs 5, because of their firmness and rigidity, being driven radially into the material 21 over a thickness which is perfectly adequate to provide satisfactory anchorage.

Figure 5:
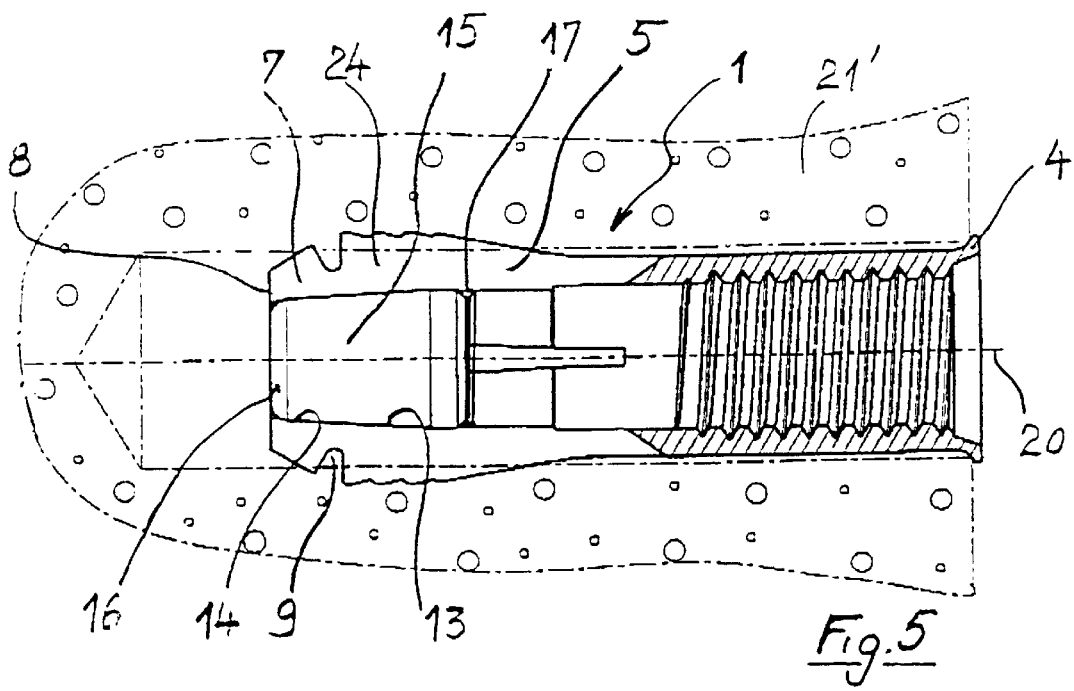
FIG. 5 is a view of the anchor in axial section after anchorage in hard material.

In hard material (FIG. 5), the firmness of the legs 5 would have prevented the plug 15 from being driven in and therefore the radial penetration of the expanding legs 5 into the material 21' to a gradually increasing extent along the axis 20. In any event, the base portions 7 of the legs 5 would have had to bite into the material 21' to an excessive thickness for at least that part of the plug 15 adjacent to its retaining strip 17 to more or less reach the axial portions 24 of the expanding legs 5 which are adjacent to the groove 9 and for these portions 24 to be able themselves to bite into the material 21' to an adequate depth to provide anchorage.

The weakening groove 9 will, at the time of driving of the plug 15, allow the sleeve to be functionally shortened by the base portion 7, extending beyond the groove 9. The groove 9, at the time of expansion, functionally, or virtually, shortens the axial expansion length of the sleeve which then extends only from its head flange 4 to the weakening groove 9, which thus constitutes the expansion end of the sleeve.

When, inside the bore 13, the plug reaches the position in which the base portions 7 of the legs 5 should be pushed out into the material 21' by the plug, the material opposes this without in any way preventing the portions 24 adjacent to the groove 9, upstream of the portions 7 in the direction in which the plug is being driven, from being pushed back themselves, because the portions 7 will be able to pivot inwards, about the region of this groove 9, with respect to the portions 24. The base portions 7 of the legs 5 thus undergo radial compression. Because of the inflection in the cone angle of the interior bore of the sleeve on each side of the plane of the groove 9 which, from conical (13), like the plug 15, here becomes cylindrical (14), the front end 16 of the plug 15 will even be able to be driven in over a sufficient axial distance beyond the plane of the groove and here reach the front end 8 of the sleeve so as to ensure perfect engagement of the leg portions 24 by the plug 15 as in a soft material; the annular clearance 25 thus created around the plug 15 (FIG. 4), with a larger cone angle than the cylindrical bore 14 in which it is located, specifically allows the radial compression of the base portion 7 of the sleeve.

Having anchored the anchor, all that is required, in order to secure the part, is for a fixing screw or bolt to be screwed into the tapping 19.

What is claimed is:

1. Anchor for hard material, said anchor comprising
   an expansible sleeve (1) with an interior bore (13) having a conical section; and
   an expander plug (15) having a conical outer surface that covers a majority of a length of said plug and has substantially the same cone angle as said conical section, whereby, through the wedge effect caused by the plug (15) being driven into the sleeve (1) the sleeve is caused to expand;
   wherein
      the sleeve has a deformable end portion;
      said sleeve has an annular weakening groove (9) formed at an end of said conical section to define said deformable end portion; and
      a cone angle of a section (14) of said internal bore in said deformable end portion is different than the cone angle of the plug (15).

2. Anchor to claim 1, wherein said end portion of the sleeve is axially inwardly compressible.

3. Anchor according to claim 1, wherein the section (14) of said internal bore in said deformable end portion is cylindrical.

4. Anchor according to claim 1, wherein the sleeve (1) has expanding legs (5) formed between slots (6), and a radial thickness of the legs increases towards the deformable end of the sleeve (1).

5. Anchor according to claim 1, wherein the sleeve has a peripheral axial gripping portion (10).

6. Anchor according to claim 1, wherein the section of said internal bore in said deformable end portion flares in a direction away from the conical section that has substantially the same cone angle as the plug.

7. Anchor according to claim 1, wherein said sleeve comprises a hollow body and two legs extending from said body, said annular weakening groove is formed in said legs and a thickness of said legs is minimal at a bottom of said annular weakening groove.

8. Anchor according to claim 1, wherein a thickness of said sleeve is about the same in regions immediately adjacent to and on opposite sides of said annular weakening groove.

9. Anchor according to claim 1, further comprising a retaining strip (17) for retaining the plug (15).

10. An expansible sleeve for use as an anchor with a plug being driven into said sleeve to cause said sleeve to expand, said sleeve comprising
    a hollow body; and
    two legs extending from said body and defining an internal axial through bore comprising an end section and a conical section contiguous to and tapering towards said end section, a cone angle of the bore being inflected to form a different cone angle at the end section, each of said legs further having a circumferential weakening groove formed at a boundary between said conical section and said end section; wherein
    said leg in an entirety of a base portion corresponding to said conical section is thicker than at a bottom of said weakening groove;
    said leg has an end portion corresponding to said end section and moveable relative to the base portion due to said weakening groove; and
    a thickness of said leg in said end portion is about the same as a thickness of said leg in a region of said base portion that is immediately adjacent to said weakening groove.

11. The sleeve of claim 10, wherein the end section is cylindrical.

12. The sleeve of claim 10, wherein the end section is conical and flares away from said conical section.

13. The sleeve of claim 10, wherein the end section is conical and has a cone angle smaller than that of said conical section.

14. The sleeve of claim 10, wherein the thickness of said end portion in a region immediately adjacent to said weakening groove is about the same as the thickness of said base portion in a region immediately adjacent to said weakening groove.

15. The sleeve of claim 10, wherein the thicknesses of said base portion and said end portion generally increase towards the weakening groove.

* * * * *